Sept. 27, 1938.     W. B. GWINN     2,131,512
APPARATUS FOR DRYING PLATES
Filed June 12, 1937     3 Sheets-Sheet 1

INVENTOR
W. B. GWINN
BY Bradley & Bee
ATTORNEYS.

Sept. 27, 1938. W. B. GWINN 2,131,512
APPARATUS FOR DRYING PLATES
Filed June 12, 1937 3 Sheets-Sheet 2

INVENTOR
W. B. GWINN
BY Bradley + Bee
ATTORNEYS.

Sept. 27, 1938.  W. B. GWINN  2,131,512
APPARATUS FOR DRYING PLATES
Filed June 12, 1937  3 Sheets-Sheet 3
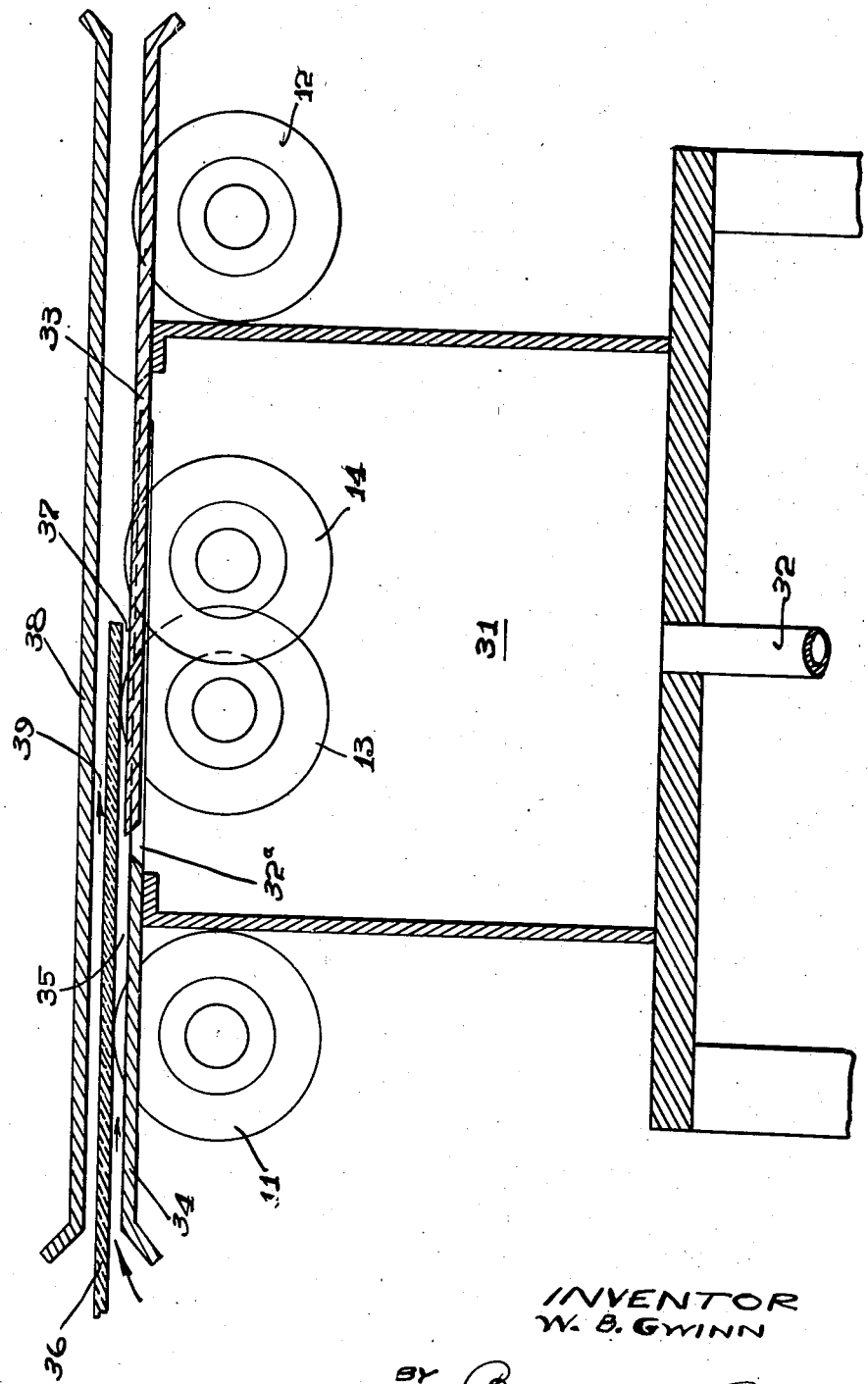
INVENTOR
W. B. GWINN
BY Bradley & Bee
ATTORNEYS.

Patented Sept. 27, 1938

2,131,512

UNITED STATES PATENT OFFICE 2,131,512

APPARATUS FOR DRYING PLATES

William B. Gwinn, Crystal City, Mo., assignor to Pittsburgh Plate Glass Company, Allegheny County, Pa., a corporation of Pennsylvania Application June 12, 1937, Serial No. 147,891

4 Claims. (Cl. 34—12)

Figure 1:
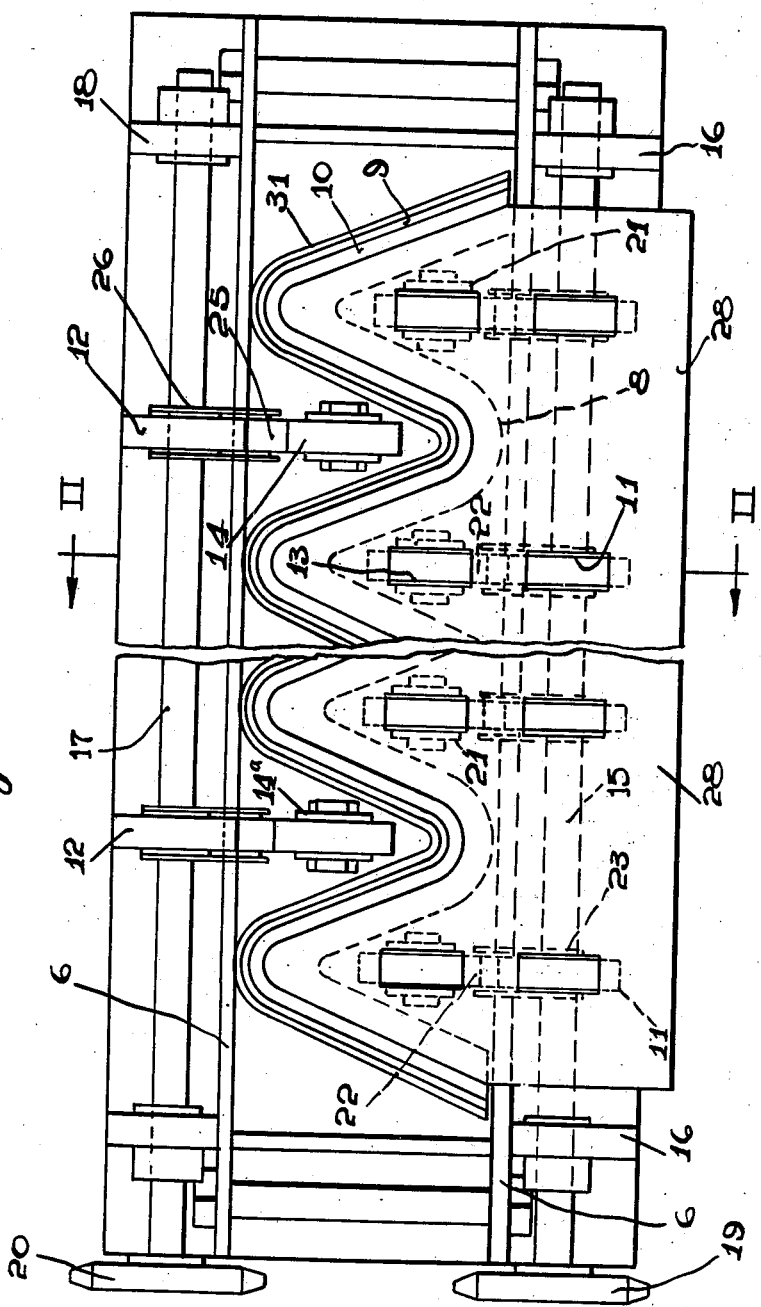
Figure 2:
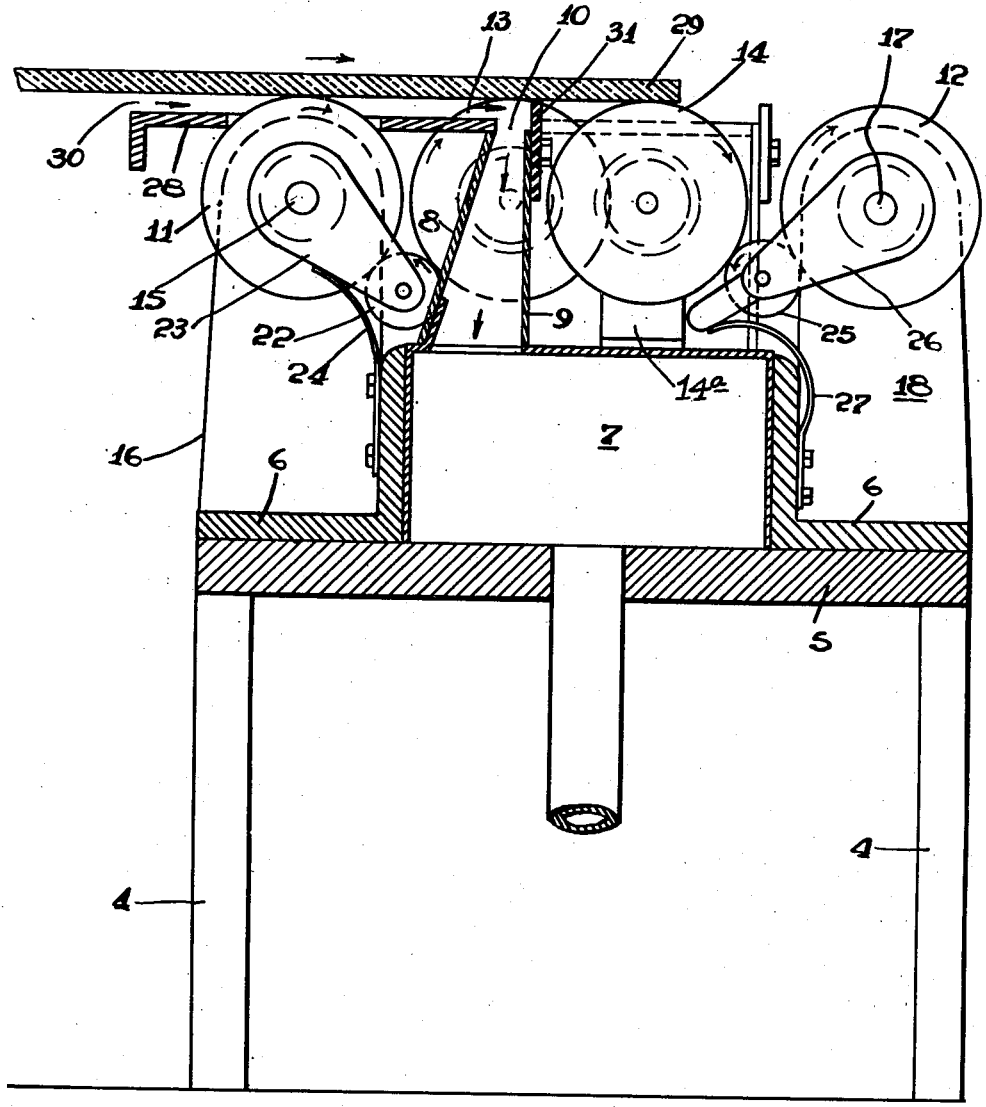

The invention relates to apparatus for drying plates, such as plate or window glass, which have been washed and particularly the lower sides thereof as they are moved along a conveyor. After washing, the plates are carried along a horizontal roll conveyor or runway exposed to air blasts on the upper sides of the plates to dry such sides and over a suction slot or nozzle which extends transversely of the runway beneath the plates and removes the layer of moisture on the lower faces of such plates. The present invention relates to the suction portion of the apparatus. It has for its principal objects: the provision of improved means for supporting the plates as they pass over the zigzag suction slot, preferably employed; and the provision of improved means whereby the suction slot acts to secure a maximum degree of moisture removal from the plates to insure that the plates shall be completely dried and with the use of a minimum amount of exhaust air. Certain embodiments of the invention are illustrated in the accompanying drawings, wherein:

Figure 1 is a plan view of one form of device. Fig. 2 is a vertical section on the line II—II of Fig. 1. And Fig. 3 is a section similar to that of Fig. 2 through a modification.

Referring to Figs. 1 and 2, the unit shown comprises a base portion including the standards 4, 4, the plate 5, and the angles 6, 6 extending the length of the units and suitably secured in assembled relation by bolting or welding. Also extending the length of the unit is a box structure 7 (Fig. 2), to which the suction slot member is connected at the upper side, such slot member being made up of the plates 8 and 9 with the inlet slot 10 at the upper end. This slot 10 is preferably of zigzag form, as indicated in Fig. 1, in order to get a maximum drying effect, this type of slot being well known in the art.

The unit is provided with a roller runway made up of four sets of rolls, 11, 11, 11, etc., 12, 12, 12, etc., 13, 13, 13, etc. and 14, 14, 14, etc. The rolls 11 are mounted on a shaft 15 extending longitudinally of the unit and mounted in suitable brackets 16. The rolls 12 are mounted upon a shaft 17 extending longitudinally of the frame and mounted in suitable brackets 18. The two shafts are provided at their ends with sprockets 19 and 20 as driven from chains which are not shown. In this connection, it will be understood that the unit is placed in series with suitable horizontal roller runways for carrying the glass sheets which are to be dried to the drying unit, and after passage thereover, carrying them past an inspection station to a suitable delivery point where they are removed and stacked. The rolls 13 are mounted for rotation in brackets 21 carried by the box 7 and each roll is driven from the roll 11 opposite to it by a roll 22 mounted on an arm 23 and frictionally engaging the surfaces of the rolls 11 and 13. The arms 23 are pivoted on the shaft 15 and are pressed yieldingly upward to give the necessary frictional engagement between the rolls by means of leaf springs 24. In this manner, the rolls 13 are driven frictionally from the rolls 11 and in the same direction so that the glass sheets are moved from left to right, as indicated by the arrow in Fig. 2. The rolls 14 mounted on brackets 14a are driven from rolls 12 in the same manner as the rolls 13 are driven from the rolls 11. In this case, the friction rolls 25 are carried by arms 26 pivoted on the shaft 17 and are held yieldingly in engagement with the rolls 12 and 14 by means of the leaf springs 27. This provides a drive for the rolls 14 and 12 in a clockwise direction the same as the rolls 11 and 13. It will be noted that the rolls 13 and 14 are located in the recesses formed in the casing of the slot 10, so that the center line of the set of rolls 13 and the center line of the set of rolls 14 are relatively close together. This is desirable in connection with the drying of small sheets of glass which would tend to tilt in passing over the drying slot, if there was any substantial break of the continuity of the roller runway. The support of the glass sheets is thus made continuous so that they will lie in a true horizontal position in passing over the slot member.

Located above the sets of rolls 11 and 13 is a control plate 28 which is continuous from one end of the unit to the other except where it is perforated to provide for the peripheries of the rolls. In passing over the unit, the glass sheet 29 is supported upon the rolls in spaced relation with respect to the plate 28, as indicated in Fig. 2, so that a slot 30 is provided. The suction which is applied to the slot member 9 causes a flow of air into the slot 10 at the upper end of such member and this in turn causes a drying current of air to pass along the lower side of the glass sheet between such sheet and the plate 28. As the slot 30 is relatively narrow, the air flows along the surface of the glass at a high rate of speed and carries away the moisture so that by the time a portion of the plates arrives immediately over the slot 10, it is thoroughly dried. In order to insure that the air shall flow through the slot 30 between the glass plate and the plate 28, the right hand end of such slot (Fig. 2) is closed by means of a strip 31 of rubber which is secured to the wall 9 of the slot member and has its upper end in contact with the glass plate or substantially so. The rubber strip follows the contour of the slot 10, as indicated in Fig. 1, and acts as a closure valve for the forward end of the slot 30. This expedient greatly increases the drying efficiency of the slot member, so that the plates are dried more thoroughly than would otherwise be the case and the amount of air required for such drying is reduced to a minimum.

Fig. 3 illustrates a modification in which 31 is the suction box from which the air is exhausted through the pipe 32. The means for driving the rolls 11, 13, 14 and 12 is the same as heretofore described. Instead of the slot member being made up of the walls 8 and 9, as in Fig. 2, the top wall of the box 31 is merely provided with a slot 32a, which corresponds in function to the slot 10. This slot is preferably zigzag in form similar to the arrangement in Fig. 1. In this case, the valve strip 31 of the first type of construction is omitted, and in order to secure a similar function, the plate 33 to the rear of the slot 32 is placed at a higher level than the control plate 34. As a result of the exhaust through the slot 32a, the major portion of the drying air flows to such slot through the slot 35 lying between the control plate and the glass sheet 36. A smaller amount of air flows through the slot 37 between the rear control plate 33 and the glass plate 36. A drying flow of air is, therefore, secured from both sides of the slot 32a, so that the general effect is the same as that secured in the Fig. 2 construction. It will be seen that the control plate 33 serves as a partial closure on the rear side of the slot 32a, so that its location at a higher level has in part the effect of the vertical valve strip 31 of the Fig. 2 construction. The construction of Fig. 3 also includes a top plate 38 which is supported in spaced relation above the line of travel of the glass sheet. The use of this plate 38 tends to reduce wastage of air when no glass plates are passing over the exhaust slot, as even with a relatively continuous operation, the glass sheets on the runway are spaced apart somewhat and without the plate 38 a much larger loss of air would occur under these conditions. The use of the plate also promotes the drying of the upper surface of the glass sheet. This upper surface has already been dried in most cases by passing beneath air blasts, but the additional drying is desirable and this is caused by the suction produced at the right hand end of the slot 37 which pulls some air through the slot 39 in the direction of the arrow, thus giving a drying effect.

What I claim is:

1. In apparatus for drying plates, a horizontal roll carrier for the plates, a suction slot extending transversely of the carrier below the plane of the upper edges of the carrier rolls, a horizontal control plate on the front side of the slot also below the plane of the upper edges of the rolls through which the rolls extend, a second horizontal control plate on the rear side of the slot through which the rolls extend having its upper surface above the upper surface of the first control plate, and means for exhausting air from the slot.

2. In apparatus for drying plates, a horizontal roll carrier for the plates, a suction slot extending transversely of the carrier below the plane of the upper edges of the carrier rolls, a horizontal control plate on the front side of the slot also below the plane of the upper edges of the rolls through which the rolls extend, a second horizontal control plate on the rear side of the slot through which the rolls extend having its upper surface above the upper surface of the first control plate, a third horizontal plate lying above the slot and the control plates with its lower surface above the level of the plates carried by the rolls, but adjacent thereto, and means for exhausting air from the slot.

3. In apparatus for drying plates, a zigzag suction slot whose walls provide alternate V-shaped recesses and V-shaped projections having its end in a horizontal plane, means for exhausting air from the slot, a roller carrier for moving the plates to be dried across the slot comprising a horizontal shaft on each side of the slot remote therefrom provided with a series of spaced rolls, and two sets of rolls mounted on individual horizontal axes, each roll of one set being mounted in one of said V-shaped recesses lying on one side of the slot, and each roll of the other set being mounted in one of the V-shaped recesses lying on the other side of the slot, means for driving said shafts, and friction driving connections between the rolls on the shafts and the rolls located in the recesses.

4. In apparatus for drying plates, a zigzag suction slot whose walls provide alternate V-shaped recesses and V-shaped projections having its end in a horizontal plane, means for exhausting air from the slot, a roller carrier for moving the plates to be dried across the slot comprising a horizontal shaft on each side of the slot remote therefrom provided with a series of spaced rolls, and two sets of rolls mounted on individual horizontal axes, each roll of one set being mounted in one of said V-shaped recesses lying on one side of the slot, and each roll of the other set being monuted in one of the V-shaped recesses lying on the other side of the slot, means for driving said shafts, and friction driving connections between the rolls on the shafts and the rolls located in the recesses, comprising an idler roll between each roll on the shafts and the adjacent roll located in a recess.

W. B. GWINN.